United States Patent
Bohan

(10) Patent No.: US 7,096,141 B2
(45) Date of Patent: Aug. 22, 2006

(54) SYSTEM AND METHOD FOR TESTING A DEVICE

(75) Inventor: Patrick Bohan, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/965,312

(22) Filed: Oct. 14, 2004

(65) Prior Publication Data
US 2005/0060612 A1   Mar. 17, 2005

Related U.S. Application Data

(63) Continuation-in-part of application No. 10/643,109, filed on Aug. 18, 2003.

(51) Int. Cl.
*G01M 19/00* (2006.01)
(52) U.S. Cl. .................................... 702/122
(58) Field of Classification Search ................ 702/108, 702/117, 118, 120, 121, 122, 189; 714/10, 714/25, 724, 738; 324/537, 765
See application file for complete search history.

(56) References Cited

U.S. PATENT DOCUMENTS

| | | | | |
|---|---|---|---|---|
| 6,541,991 B1* | 4/2003 | Hornchek et al. | ........... | 324/755 |
| 6,625,558 B1* | 9/2003 | Van Ausdall et al. | ....... | 702/117 |
| 6,744,267 B1* | 6/2004 | Sauk et al. | ................. | 324/754 |
| 2005/0200376 A1* | 9/2005 | Yee et al. | .................... | 324/765 |

* cited by examiner

*Primary Examiner*—Bryan Bui
(74) *Attorney, Agent, or Firm*—Yinsheng Tung; W. James Brady; Frederick J. Telecky, Jr.

(57) ABSTRACT

In a method and system for testing a device, a tester is operable to generate a first set of test signals for testing the device. The tester is electrically coupled to a test head, which in turn provides electrical coupling to the device. A test assembly is operable to generate a second set of test signals for testing the device. The test assembly is electrically coupled to an interface apparatus, which is adapted to be removably secured to the test head. The interface apparatus is operable to communicate the first and second set of test signals to the device.

22 Claims, 4 Drawing Sheets

SYSTEM AND METHOD FOR TESTING A DEVICE

CROSS REFERENCE TO RELATED APPLICATIONS

This application is a continuation-in-part of U.S. Ser. No. 10/643,109 filed Month Aug. 18, 2003, entitled 'System And Method For Testing A Device', which is hereby incorporated herein in its entirety.

BACKGROUND

The present disclosure relates generally to test systems, and more particularly to a system and method for testing electrical devices requiring a variety of test signals.

Manufacturers of electrical/electronic devices such as integrated circuits, radio frequency (RF) circuit devices, printed circuit boards, and other circuits, typically use automatic test equipment (ATE) or similar other test systems to test the devices during the production process, preferably before they are installed by a user. The test systems are generally configured to apply a test signal to the device and measure its response. A device under test (DUT) is typically mounted on a test board, which in turn is secured to a test head. Depending on the size of the test system, the test head may include several thousand electrical connectors for electrically coupling the test system to the DUT. Test signals generated by the test system are communicated to the DUT via the test head and the test board. Different DUT's may require a corresponding matching test board. The size, layout and arrangement of the test head may vary by manufacturer but is generally fixed for a particular test system.

Today, many commercially available, advanced, multi-function ATE systems generate several types of test signals for testing various attributes of the DUT. However, many of these test systems are very complex, bulky, often require additional heat removal systems and typically cost several million dollars thereby making them unattractive for use in a cost driven manufacturing environment. In addition, the test systems often lack the flexibility to cost effectively integrate one or more test signals, which may be required to test the DUT but may not be supported by the test system manufacturer. For example, many test systems may not support RF signals and/or high speed digital (HSD) signals which may be required for testing a DUT. It may take the test system manufacturer a longer-than-desirable time period to support the required test signals in the test system, and it may be supported at an unaffordable cost.

In a manufacturing/production line environment, complex and bulky test systems often decrease production efficiency and increase costs since they often require elaborate set up and dismantling procedures. In addition, some of the test systems may not be suitable for use in production areas having limited accessibility and tighter space clearances.

Therefore, a need exists to provide an efficient method and system for testing electrical devices requiring a variety of test signals. Additionally, a need exists to provide an improved technique to cost effectively and timely integrate a required test signal into an existing or legacy test system for testing the DUT. Accordingly, it would be desirable to provide an improved test system for testing devices, absent the disadvantages found in the prior methods discussed above.

SUMMARY

The foregoing need is addressed by the teachings of the present invention, which relates to a system and method for testing a device. According to one embodiment, in a method and system for testing a device, a tester is operable to generate a first set of test signals for testing the device. The tester is electrically coupled to a test head, which provides electrical coupling to the device. A test assembly is operable to generate a second set of test signals for testing the device. The test assembly is electrically coupled to an interface apparatus, which is adapted to be removably secured to the test head. The interface apparatus is operable to communicate the first and second set of test signals to the device.

In one embodiment, a method for adding a test signal to test a device a first set of test signals generated by a tester are received for testing the device. The tester is electrically coupled to a test head, which is electrically coupled to the device. A second set of test signals generated by the test assembly is received for testing the device. The test assembly is electrically coupled to an interface apparatus, which is adapted to be removably secured to the test head. The interface apparatus provides electrical coupling to the device. The first and second set of test signals are communicated directly to the device directly or through a test board, which is adapted to be removably secured to the interface apparatus. The test board provides electrical coupling between the interface apparatus and the device.

Several advantages are achieved by the method and system according to the illustrative embodiments presented herein. The embodiments advantageously provide for an improved technique to cost effectively add one or more test signals, required to test a device, to another set of test signals being generated by a different test system. Thus, customized test signals that are not available from legacy test systems may be generated by off-the-shelf signal generator modules and cost effectively integrated with test signals of the legacy system to test the device. This advantageously enables manufacturing facilities to adapt existing test systems to rapidly changing test signal requirements in a cost effective and timely manner.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip), firmware (including application specific integrated circuits and programmable chips) and/or software or a combination thereof, depending on the application requirements.

Many commercially available, advanced, multi-function test systems are often very complex, bulky, require additional heat removal systems and typically cost several million dollars. In addition, the test systems may not be flexible to cost effectively integrate one or more test signals, which may be required to test the DUT but may not be supported by the test system manufacturer. This problem may be addressed by an improved system and method to test a device, especially in a manufacturing environment. In the improved system and method, one or more test signals required to test a device are cost effectively added to the test signals generated by a legacy test system. The improved test system is configured to apply the combined test signals to the device and measure its response.

According to one embodiment, in a method and system for testing a device, a tester is operable to generate a first set of test signals for testing the device. The tester is electrically coupled to a test head, which in turn provides electrical coupling to the device. A test assembly is operable to generate a second set of test signals for testing the device. The test assembly is electrically coupled to an interface apparatus, which is adapted to be removably secured to the test head. The interface apparatus is operable to communicate the first and second set of test signals to the device.

Figure 1A:
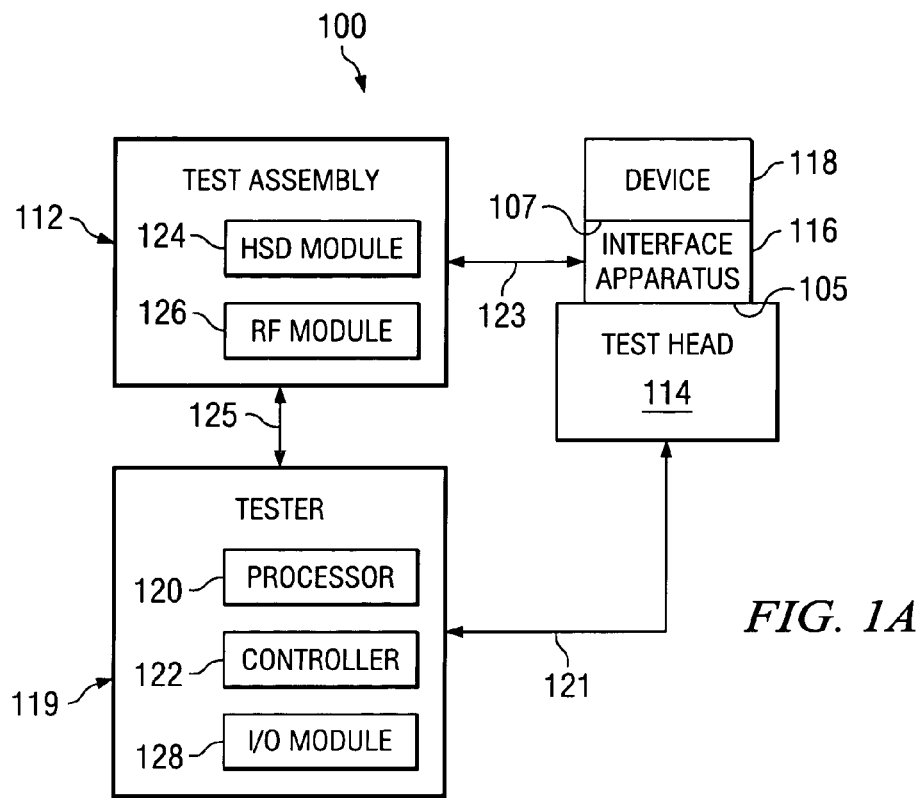
FIG. 1A illustrates an improved test system for testing a device, according to an embodiment.

FIG. 1A illustrates a block diagram of an improved test system 100 for testing a device 118, according to an embodiment. The test system 100 includes a tester 119 operable to communicate a plurality of test signals (not shown) to a test head 114 via one or more electrical couplers 121 (such as conductors, cables, lines, links and buses). In the depicted embodiment, the tester 119 includes a processor 120, an input/output (I/O) module 128 and one or more test controllers 122. The tester 119 may include an internal bus (not shown) to facilitate communications between various modules such as 120, 122 and 128.

The plurality of test signals may include various well known test signals types including alternating current (AC) and/or direct current (DC), analog and/or digital, time and/or frequency, synchronous and/or asynchronous, pulse, clock and similar others. In one embodiment, a first set of test signals generated by the tester 119 includes at least one test signal. In one embodiment, the first set of test signals include a DC power signal to power the device 118 and a low speed digital signal having a frequency less than 100 MHz.

The test system 100 also includes a test assembly 112 operable to provide a plurality of test signals to an interface apparatus 116 via one or more electrical couplers 123 (such as conductors, cables, lines, links and buses). In the depicted embodiment, the test assembly 112 includes a radio frequency (RF) module 126 and a high speed digital (HSD) module 124. The test assembly 112 may include an internal bus (not shown) to facilitate communications between various modules such as 124 and 126.

In one embodiment, a second set of test signals (not shown) generated by the test assembly 112 includes at least one test signal. In one embodiment, the second set of test signals includes at least one test signal not included in the first set of test signals. In one embodiment, the second set of test signals include a RF signal and a HSD signal having a frequency greater than or equal to 100 MHz.

In the depicted embodiment, the test assembly 112 is electrically coupled to the tester 119 via one or more communications links 125. The links 125 may be implemented by using all or a portion of a bus connection, one or more local area networks (LAN's), metropolitan area networks (MAN's), wide area network (WAN's), a global network such as the Internet, any other appropriate wire line, wireless or other similar communication link. In one embodiment, the test assembly 112 is operable to receive data from the tester 119 to selectively modify a signal characteristic such as signal type of at least one of the second set of test signals.

In the depicted embodiment, the interface apparatus 116 is removable from or secured to the test head 114. That is, the interface apparatus 116 is secured to the test head 114 in a removable manner or the interface apparatus 116 is 'removably secured' to the test head 114. The interface apparatus 116 includes a docking mechanism (not shown) enabling its bottom plate assembly 105 to be secured (or docked) to the test head 114 and the top plate assembly 107 to the device 118 for testing purpose. In the secured position, the interface apparatus 116 provides electrical coupling between the test head 114 and the device 118. Since the size, layout and arrangement of the test head 114 may vary depending on the type and size of the tester 119, the interface apparatus 116 may be customized, configured or adapted to meet the unique requirements for each testing application.

In some test systems, the test head 114 may include modules (not shown) that may facilitate testing the device 118. For example, the test head 114 may include a calibration module (not shown) to calibrate one or more test signals included in the first set of test signals. As another example, the test head 114 may include signal loss compensation circuits (not shown) to compensate for loss of signal.

Figures 2A, 2B, 2C:
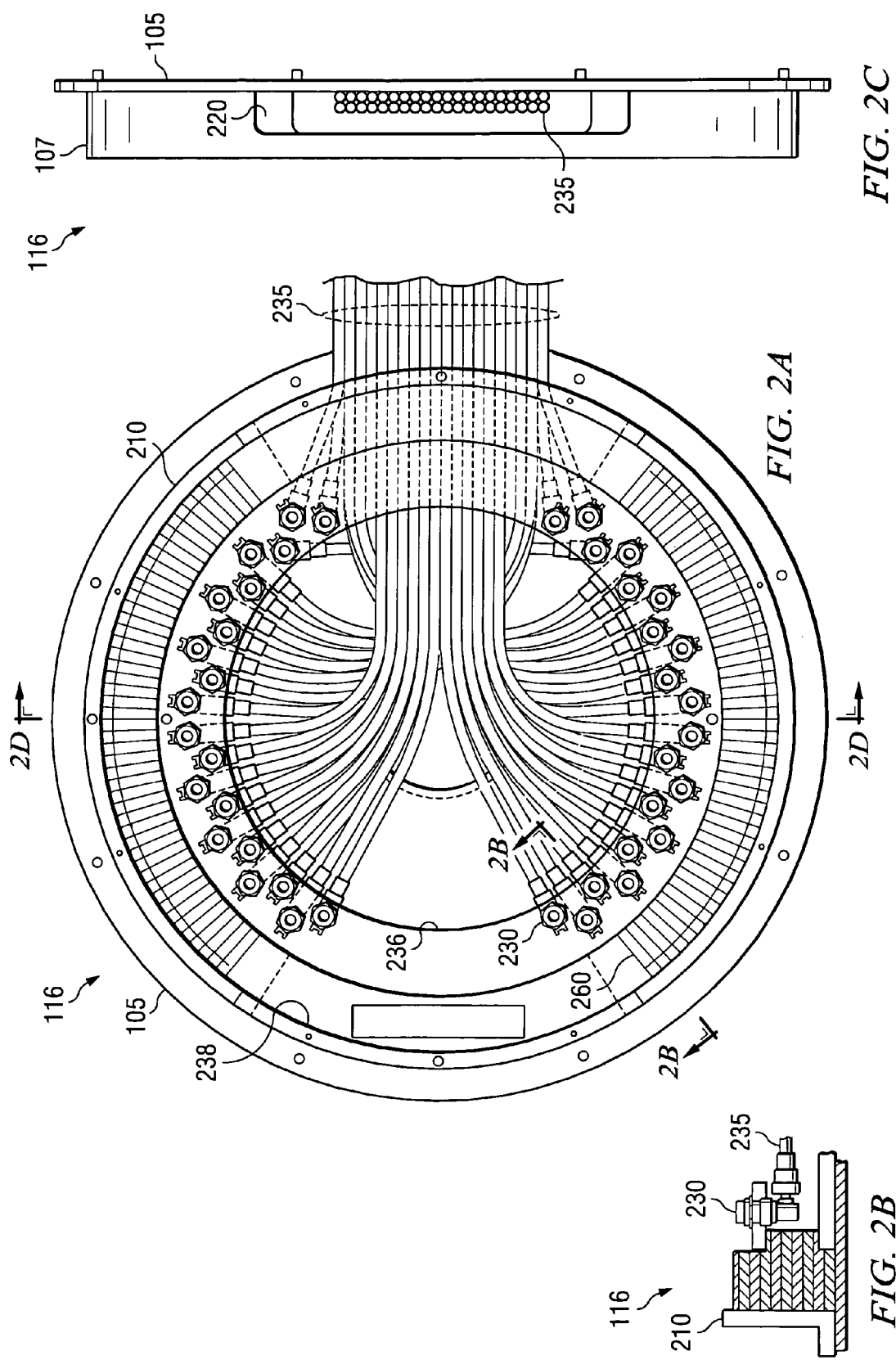
FIGS. 2A, 2B and 2C are multiple view diagrams illustrating details of an interface apparatus of FIG. 1A, according to an embodiment.

The interface apparatus 116 may use any well known mechanical docking systems. For example, in a docking system deployed in many pressure cookers, a pressure cooker lid (illustrative of the interface apparatus 116) is removably secured to the pressure cooker base (illustrative of the test head 114) by a process using ridge alignment, vertical pressure and handle rotation. Additional detail of the interface apparatus 116 is shown in FIGS. 2A and 2B.

Figure 1B:
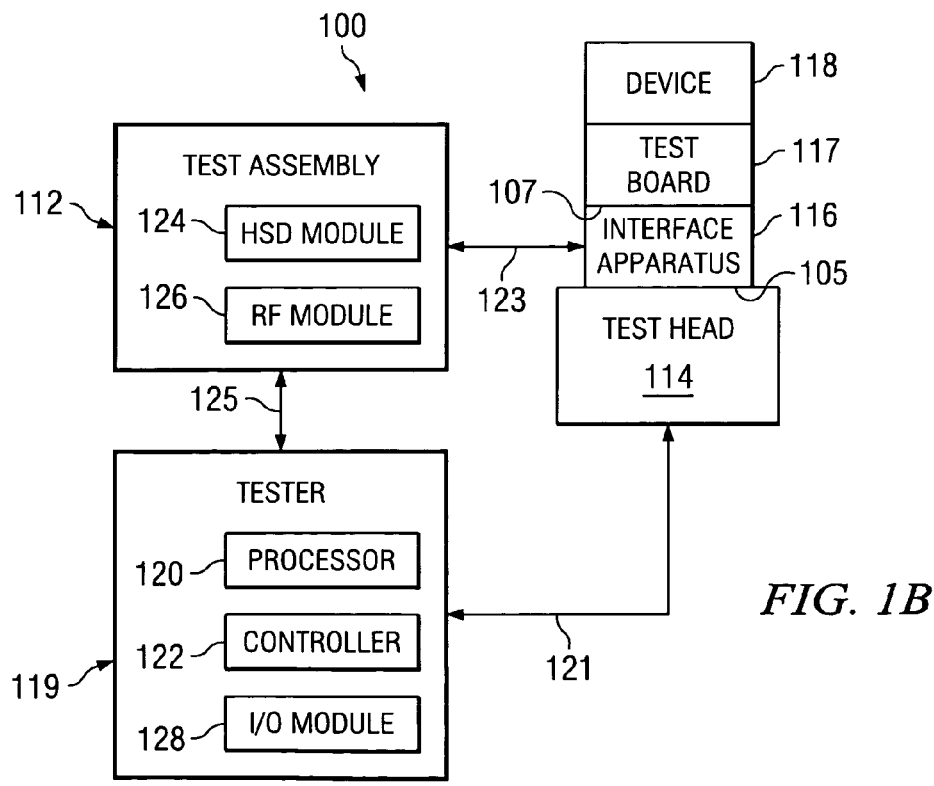
FIG. 1B illustrates a block diagram of an improved test system for testing a device mounted on a test board, according to an embodiment.

FIG. 1B illustrates a block diagram of the improved test system 100 for testing a device 118 mounted on a test board 117, according to an embodiment. Depending on the type of the device 118 to be tested (e.g., a printed circuit board or a chip), the device 118 may be directly or indirectly connected to the interface apparatus 116. In one embodiment, the device 118 is an integrated circuit chip. In this embodiment, the chip (illustrated by the device 118) is mounted on the test board 117. The test board 117 provides the electrical interface between the interface apparatus 116 and the device 118. Thus, the tester 119 is electrically coupled to the device 118 via the test head 114, the interface apparatus 116 and the test board 117.

The test board 117 is removable from or secured to the test apparatus 116. The interface apparatus 116 includes a docking mechanism (similar to the docking mechanism with the test head 114 described earlier) for enabling its top plate assembly 107 to be docked or secured to the test board 117 for testing purpose. In the secured position, the test board 117 provides electrical coupling between the test apparatus 116 and the device 118.

Figure 1C:
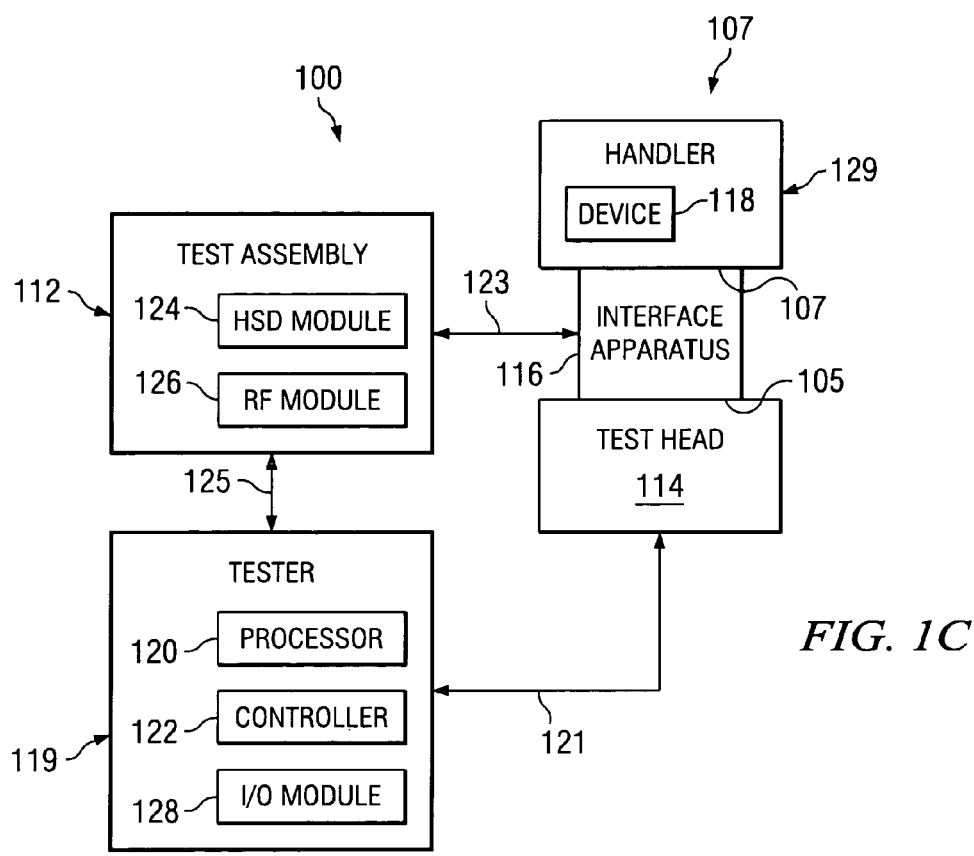
FIG. 1C illustrates a block diagram of the improved test system for testing a device positioned by a handler, according to an embodiment.

FIG. 1C illustrates a block diagram of the improved test system 100 for testing a device 118 positioned by a handler (or prober) 129, according to an embodiment. In one embodiment, the handler 129 is used to automatically position the device 118 such that the interface apparatus 116 is proximate to the device 118. In one embodiment, the handler 129 performs one or more additional functions such as sorting of the device 118 according to various types, controlling temperature of a test chamber during heat testing, or handle the device 118 in any other suitable fashion. In one embodiment, the handler 129 facilitates minimizing the coupling distances between the device 118 and the interface apparatus 116 to reduce test signal losses. In one embodiment, the device 118 may be positioned for probing by the prober 129.

Referring back to FIG. 1A, the device 118 may be suitable to be directly coupled to the interface apparatus 116, according to one embodiment. For example, some printed circuit board devices may be suitable for a direct connection. In this embodiment, the test board 117 may be optional. That is, the tester 119 is electrically connected to the device 118 via the test head 114, and the interface apparatus 116 without the use of the test board 117. Regardless of the presence or absence of the test board 117, the test system 100 provides independent signal paths for the first and second set of test signals from the tester 119 and test assembly 112 respectively to the device 118. Thus, an electrical path for the second set of test signals, which originate from the test assembly 112 and end at the device 118, completely bypasses the test head 114.

As described earlier, the tester 119 includes the processor 120, test controllers 122 and the input/output (I/O) module 128 all of which may be electrically coupled by an internal bus (not shown). The tester 119 is operable to generate a first set of test signals. In one embodiment, the tester 119 may be a legacy or in-house test system.

In one embodiment, the processor 120 is operable to execute test instructions (also referred to as a test program) that may be used to generate the first set of test signals for testing the device 118. The test instructions may be stored in memory (not shown) associated with the tester 119 and/or the test assembly 112. The processor 120 is operable to execute instructions, which may initiate the generation of test signals. For example, the processor 120 is operable to access the test assembly 112 via the links 125, instruct the RF module 126 and/or the HSD module 124 to generate all or a portion of the second set of test signals. As another example, the processor 120 is operable to execute instructions corresponding to bit error rate testing thereby instructing the HSD module 124 to generate a set of test signals corresponding to the bit error rate test. The processor 120 may also initiate measurement of how device 118 processes the first and second set of test signals.

The I/O module 128 is operable to handle I/O from/to the tester 119. The one or more test controller 122 may be used to perform various control functions associated with the test such as powering up the device 118, setting the device 118 in a particular mode of operation (such as a test mode), configuring or instructing the test assembly 112 modules 124 and 126 to generate specific test signals associated with a particular test.

As described earlier, the test assembly 112 includes the HSD module 124 and the RF module 126 in the depicted embodiment. The type and number of modules included in the test assembly 112 may vary from one or more depending on the specific type of test signals required for testing the device 118. Thus, the test assembly 112 includes at least one signal generator module such as modules 124 and 126 to generate at least one test signal included in the second set of test signals. The test assembly 112 may include an internal bus (not shown) to facilitate internal and/or external communication.

Figure 3:
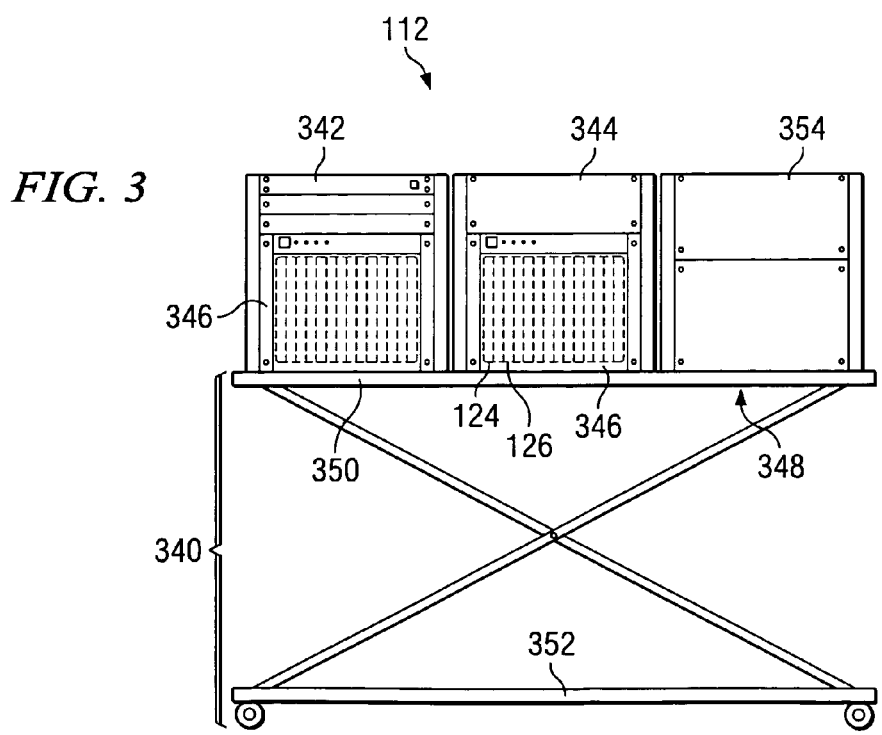
FIG. 3 is a block diagram illustrating details of a test assembly of FIG. 1A, according to an embodiment.

In one embodiment, the test assembly 112 is assembled from off-the-shelf, commercially available, low cost, signal generator modules. Types of modules included in the test assembly 112 may include instruments, signal processors, measuring devices, test boards, signal generators and many other suitable modules that generate test signals and/or measure responses to the test signals. In one embodiment, the signal generator modules such as modules 124 and 126 are assembled using low cost, commercially available components and/or commodity hardware such as personal computer boards. Thus, test signal requirements for generating unique test forms, shapes or patterns not found in legacy test systems may be accommodated by the test system 100 in a timely, low cost fashion by simply adding one or more corresponding signal generator modules to the test assembly 112. Additional detail of the test assembly 112 is illustrated in FIG. 3.

Configuration of the test system 100 may be adapted to match the requirements of the testing. Thus, modifications, additions or omissions may be made to test system 100 without departing from the spirit and scope of the invention. For example, processor 120 may be located at the test assembly 112 in addition to and/or in lieu of the tester 119. As another example, the test system 100 may include additional modules such as power supplies (not shown) and low speed digital modules (not shown) operable to generate test signals having a frequency less than 100 MHz. As yet another example, the first and second set of test signals may be generated in a substantially concurrent or parallel manner, and communicated to the device 118 in a substantially simultaneous manner. In some test systems, the first and second set of test signals may be asynchronously communicated to the device 118.

FIGS. 2A, 2B and 2C are multiple view diagrams illustrating details of the interface apparatus 116 of FIG. 1A, according to an embodiment. As described earlier, size, shape and layout of the interface apparatus 116 is adapted to match corresponding characteristics of the test head 114. In the depicted embodiment, the interface apparatus 116 includes: the bottom plate assembly 105 adapted to be removably secured to the test head 114 (not shown) of a tester and the top plate assembly 107 secured to the bottom plate assembly 105 by a peripheral sidewall 210. The peripheral sidewall 210 has at least one opening 220 to enable a plurality of conductors 235 to communicate the second set of test signals to the device 118.

The top plate assembly 107 includes an annular ring structure having an inner edge 236 and an outer edge 238. The outer edge 238 coincides with an edge of the peripheral wall 210. In one embodiment, a first set of connectors 260 are arranged in several rows in proximity to the outer edge 238. In the depicted embodiment, the first set of connectors 260 include pogo style pin connectors. The first set of connectors 260 receive the first set of test signals from the test head 114 and simply pass through the first set of test signals to the device 118. The plurality of conductors 235 terminates in a second set of connecters 230 for communicating the second set of test signals. The second set of connectors 230 may be arranged in one or more rows between the inner edge 236 and the first set of connectors 260. Although the depicted embodiment shows two rows of RF connectors, the interface apparatus 116 may include any number and/or type of connectors suitably arranged without departing from the spirit and scope of the invention.

Figure 2D:
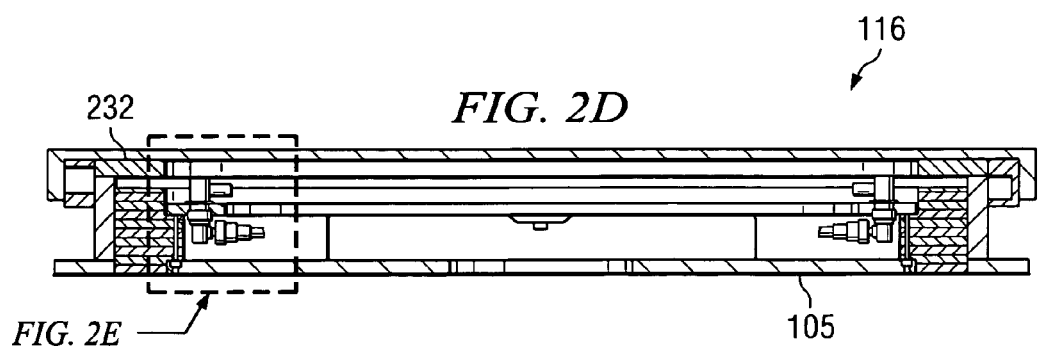
FIGS. 2D and 2E illustrate a cross sectional view of an interface apparatus of FIG. 1A showing detail of a matched connector, according to an embodiment.
Figure 2E:
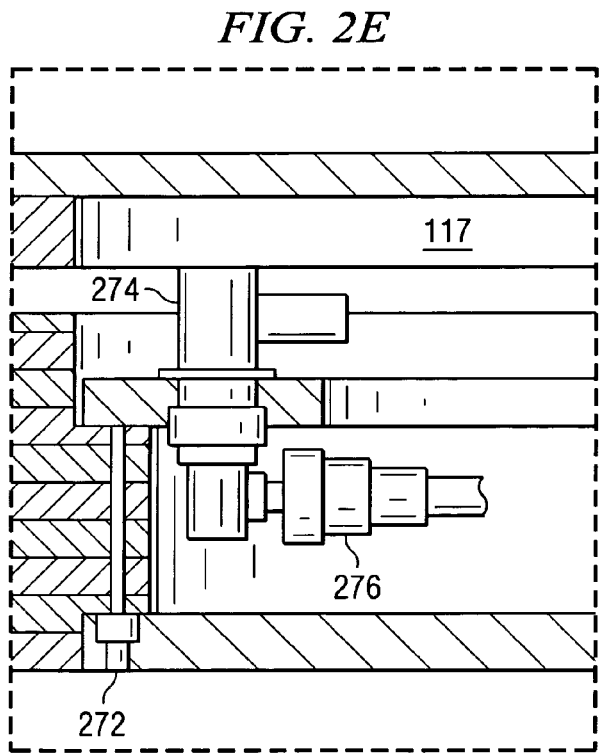

FIGS. 2D and 2E illustrate a cross sectional view of the interface apparatus 116 of FIG. 1A illustrating detail of a matched connector, according to an embodiment. The bottom plate assembly 105 includes a matching pogo style pin connector 272 to receive one of the first set of test signals from a corresponding terminal (not shown) in the test head 114. The signal is communicated to the device 118 (not shown) via the test board 117. The interface apparatus 116 includes a coupling plane 232 for providing electrical and mechanical coupling between the interface apparatus 116 and the device 118 (shown in FIG. 1A), the test board 117 (shown in FIG. 1B) or the handler 129 (shown in FIG. 1C).

In one embodiment, the test board 117, which mounts the device 118, is adapted to be removably secured to the top plate assembly 107 by a similar docking mechanism as used for securing the base plate assembly 105. In the secured position, the test board 117 includes a mating connector 274 to mate with a corresponding connector 276 of the second set of connectors 230. When the test board 117 is secured to the interface apparatus 116, the mating of the corresponding connectors establishes electrical coupling between the two devices and enables the first and second set of connectors 260 and 230 to communicate the first and second set of test signals to the device 118 via independent paths.

The first and second set of connectors 260 and 230 may include any type of connector, which may be suitable to communicate test signals in the frequency range required by the device 118 without departing from the spirit and scope of the invention. For example, HSD test signals having a frequency greater than 100 MHz may utilize Omni-Spectra subminiature push-on (OSP) type connectors (not shown).

FIG. 3 is a block diagram illustrating details of the test assembly 112 of FIG. 1A, according to an embodiment. In the depicted embodiment, the test assembly 112 is incorporated on a movable rack 340 thereby enabling the test assembly 112 to be moved to various test locations of a production line. The mobility of the test assembly 112 ensures that the coupling distance between the test assembly 112 and the interface apparatus 116 is sufficiently short, such as 1 meter, to reduce signal loss. Maintaining proximity between sources of test signals such as the test assembly 112 and the DUT such as the device 118 may be important, especially when communicating RF and/or HSD test signals.

In the depicted embodiment, the test assembly 112 includes a computer 342, one or more mainframes 346 (also referred to as card files or chassis) which can house one or more cards or modules such as 124 and 126, a power module 344 and a time measurement unit 354, all of which are mounted on the movable rack 340. In one embodiment, the power module 344 provides power to the test assembly 112, including modules such as 124 and 126. In one embodiment, the power module 344 may be housed in the mainframe 346 chassis. The test assembly 112 may be mounted on an adjustable height platform 350 of the movable rack 340. In one embodiment, height of the platform 350 is adjusted in the range between approximately 7 inches to approximately 55 inches.

In one embodiment, tools such as a mechanical lever, a pneumatic pump or an electric motor may be used to adjust the height of the platform 350. The movable rack 340 may lift the test assembly 112 to a higher or lower height without departing from the spirit and scope of the invention. In addition, movement in horizontal, vertical or any other suitable axis is supported to ensure sufficiently short coupling distance to reduce signal losses.

In the depicted embodiment, the test assembly 112 includes a ventilation system 348 to ensure sufficient removal of heat generated by the test assembly 112. In one embodiment, the ventilation system 348 is based on an air-cooling system.

Figure 4:
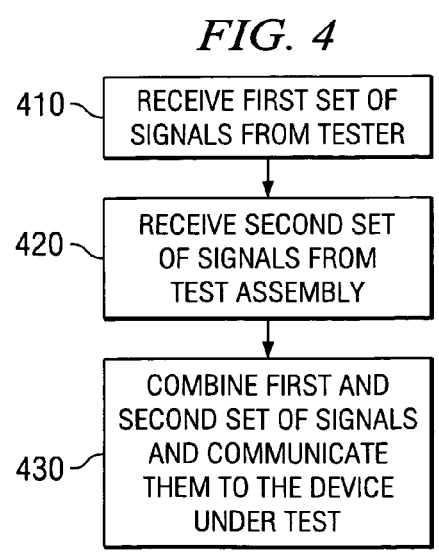
FIG. 4 illustrates a flow chart of a method for adding a test signal to test a device, according to an embodiment.

FIG. 4 is a flow chart illustrating a method for testing a device, according to an embodiment. In step 410, a first set of test signals generated by the tester 119 are received for testing the device 118. The tester is electrically coupled to the test head 114, which in turn is electrically coupled to the device 118. In step 420, a second set of test signals generated by the test assembly 112 are received for testing the device. The test assembly 112 is electrically coupled to the interface apparatus 116, which is adapted to be removably secured to the test head 114. The interface apparatus 116 provides electrical coupling to the device 118. In step 430, the first and second set of test signals are communicated to the device 118. In one embodiment, the signals may be communicated to the device 118 through the test board 117, which is adapted to be removably secured to the interface apparatus 116. The test board 117 provides electrical coupling between the interface apparatus 116 and the device 118. Various steps described above may be added, omitted, combined, altered, or performed in different orders.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. Accordingly, it is appropriate that the appended claims be construed broadly and in a manner consistent with the scope of the embodiments disclosed herein.

What is claimed is:

1. A test system for testing a device, the test system comprising:
    a tester operable to generate a first set of test signals for testing the device, wherein the tester is electrically coupled to a test head; and
    a test assembly operable to generate a second set of test signals for testing the device, wherein the test assembly is electrically coupled to an interface apparatus adapted to be removably secured to the test head, wherein the interface apparatus is operable to communicate the first and second set of test signals to the device.

2. In the system of claim 1, wherein the device is mounted on a test board, wherein the test board is adapted to be removably secured to the interface apparatus thereby enabling communication of the first and second set of test signals to the device.

3. In the system of claim 1, wherein the tester includes:
    a processor operable to execute a plurality of test instructions, wherein the execution of at least one of the plurality of instructions generates the first set of test signals.

4. In the system of claim 1, wherein the test assembly includes:
    at least one signal generator module, wherein the at least one signal generator module is operable to generate at least one of the second set of test signals.

5. In the system of claim 4, wherein the at least one of the second set of test signals is a high speed digital signal having a frequency greater than 100 MHz.

6. In the system of claim 4, wherein the at least one of the second set of test signals is a radio frequency signal.

7. In the system of claim 4, wherein the test assembly includes at least one chassis to house the at least one signal generator module, wherein the test assembly is movably positioned to be substantially proximate to the interface apparatus.

8. In the system of claim 7, wherein the test assembly is configured to add a second signal generator module, wherein the second signal generator module is housed in the at least one chassis, wherein the second signal generator module is operable to generate a second one of the second set of signals.

9. In the system of claim 4, wherein the at least one of the second set of signals is excluded from the first set of test signals.

10. In the system of claim 1, wherein the test assembly is operable to receive data from the tester, wherein the data received selectively modifies a signal characteristic of at least one of the second set of test signals.

11. In the system of claim 1, wherein the first set of test signals include a power signal to power the device and a low frequency digital signal having a frequency less than 100 MHz.

12. In the system of claim 1, wherein the interface apparatus is secured to the test head prior to conducting the testing.

13. In the system of claim 1, wherein an electrical path for the second set of test signals bypasses the test head.

14. A method for testing a device, the method comprising:
receiving a first set of test signals for testing the device, wherein the first set of test signals are generated by a tester, wherein the tester is electrically coupled to a test head;
receiving a second set of test signals for testing the device, wherein the second set of test signals are generated by a test assembly, wherein the test assembly is electrically coupled to an interface apparatus adapted to be removably secured to the test head, wherein the interface apparatus is operable to communicate the first and second set of test signals to the device; and
communicating the first and second set of test signals to the device.

15. In the method of claim 14, wherein the first and second set of test signals are communicated to the device through a test board adapted to be removably secured to the interface apparatus, wherein the test board provides electrical coupling between the interface apparatus and the device.

16. In the method of claim 14, wherein the test assembly is movably positioned to be substantially proximate to the interface apparatus.

17. In the method of claim 14, wherein the first and second set of test signals are communicated to the device in a substantially simultaneous manner.

18. In the method of claim 14, wherein the first and second set of test signals are generated in a substantially concurrent manner.

19. An interface apparatus for testing a device, the interface apparatus comprising:
a bottom plate assembly adapted to be removably secured to a test head of a tester, wherein the test head includes a plurality of terminals for communicating a first set of test signals generated by the tester, wherein the bottom plate assembly includes a corresponding first set of connectors matching the plurality of terminals;
a top plate assembly secured to the bottom plate assembly by a peripheral sidewall, wherein the peripheral sidewall has at least one opening to allow a plurality of conductors, wherein the plurality of conductors terminate in a second set of connecters for communicating a second set of test signals; and
a test board to mount the device, wherein the test board is adapted to be removably secured to the top plate assembly, wherein the test board is electrically coupled to the first and second set of connectors for communicating the first and second set of test signals to the device.

20. In the interface apparatus of claim 19, wherein the first set of connectors include a plurality of pogo pin connectors.

21. In the interface apparatus of claim 19, wherein the second set of connectors include a plurality of connectors suitable for carrying a radio frequency signal.

22. In the interface apparatus of claim 19, wherein the second set of connectors include a plurality of connectors suitable for carrying a high speed digital signal having a frequency greater than 100 MHz.

* * * * *